H. I. EATON.
DITCHING MACHINE.
APPLICATION FILED OCT. 25, 1916.
1,300,142.
Patented Apr. 8, 1919.
2 SHEETS—SHEET 1.
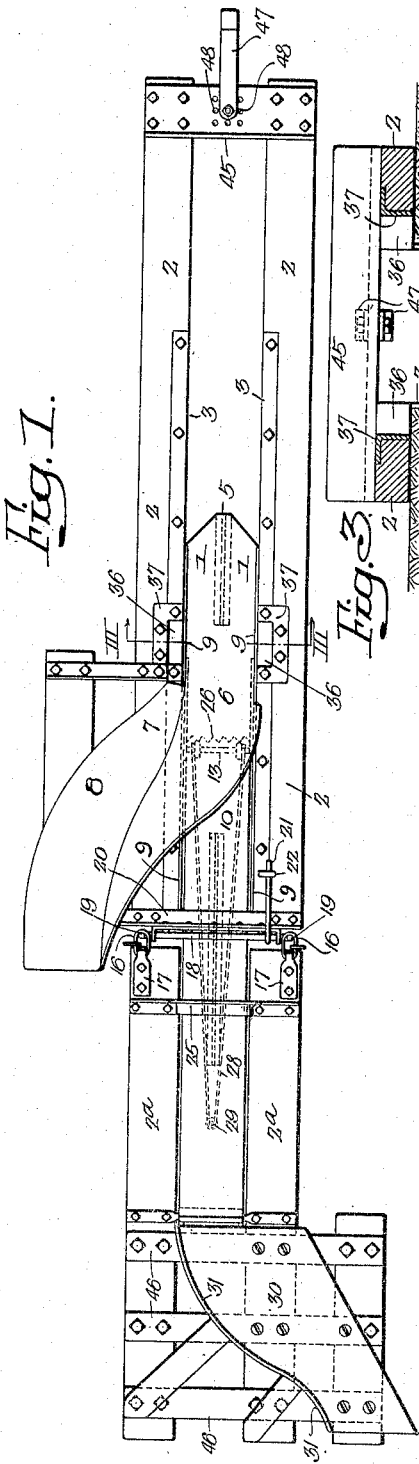
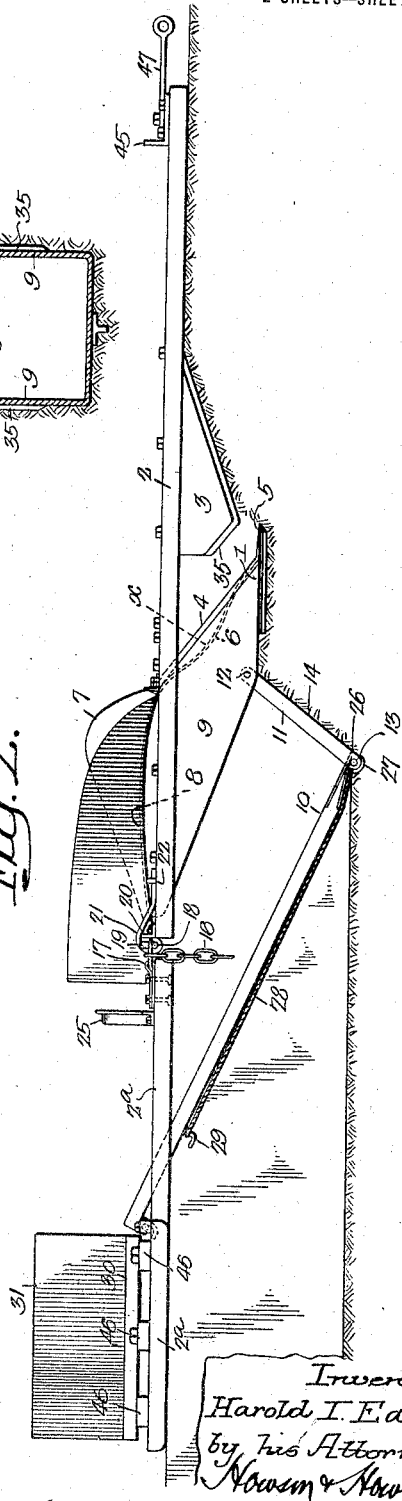

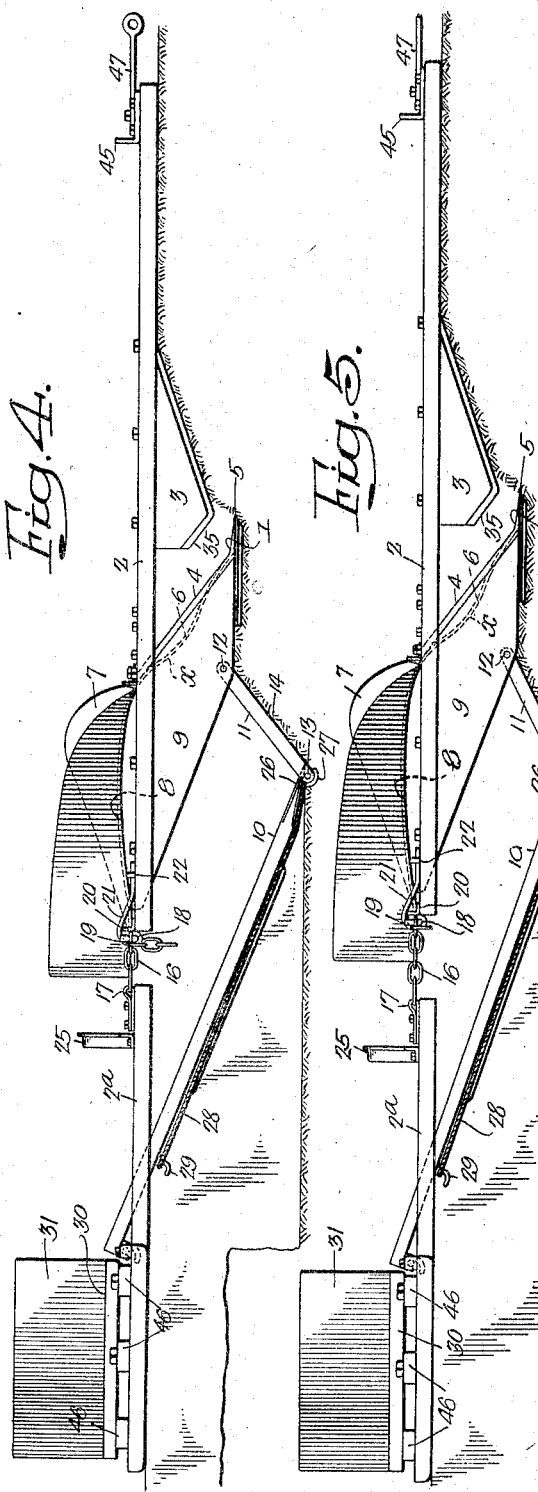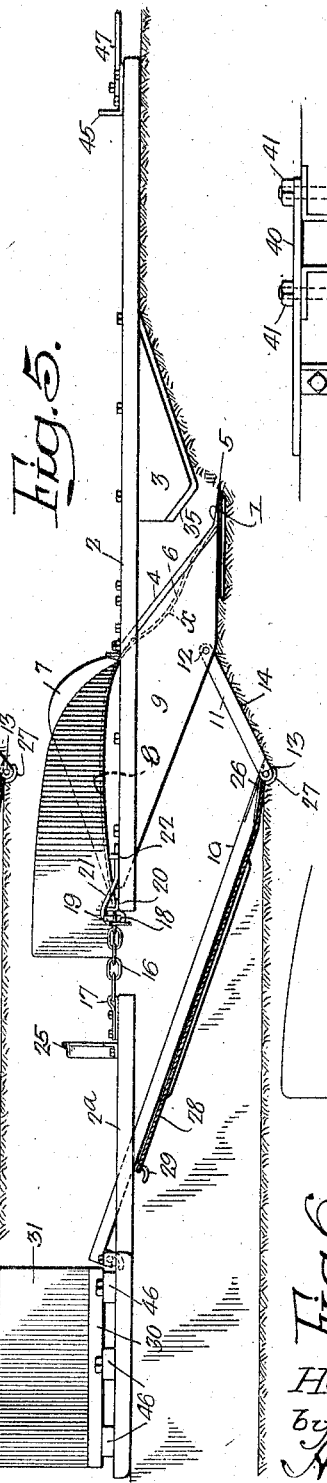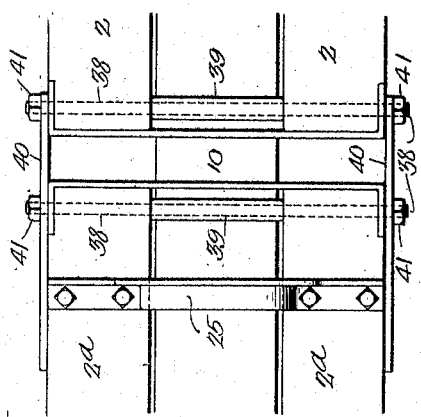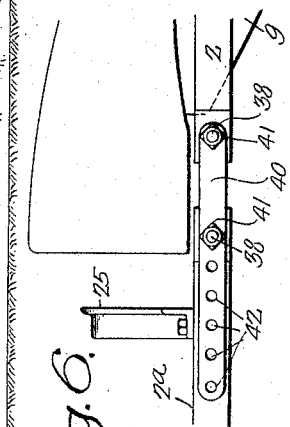

UNITED STATES PATENT OFFICE.

HAROLD I. EATON, OF ATLANTIC CITY, NEW JERSEY, ASSIGNOR TO EATON, BROWN & SIMPSON, INC., OF ELIZABETH, NEW JERSEY, A CORPORATION OF NEW JERSEY.

DITCHING-MACHINE.

1,300,142. Specification of Letters Patent. Patented Apr. 8, 1919.

Continuation of application Serial No. 93,729, filed April 26, 1916. This application filed October 25, 1916. Serial No. 127,647.

*To all whom it may concern:*

Be it known that I, HAROLD I. EATON, a citizen of the United States, and a resident of Atlantic City, Atlantic county, New Jersey, have invented certain Improvements in Ditching-Machines, of which the following is a specification.

My invention relates to that class of digging machines employed for cutting trenches or ditches, and the particular object of my invention is to provide a power impelled or propelled machine for cutting narrow drainage ditches in meadowland or marshes, particularly ocean meadowland or marshes. Machines built in accordance with my invention have been and are now employed for cutting trenches in marshland for drainage purposes with a view of exterminating the mosquito.

The prime object of my invention is to construct a simple and effective machine adapted to be dragged over and through the ground or marsh in predetermined lines, and one that is especially adapted to cut trenches of varying depth, the spoil from which is raised and discharged along inclined ways behind the cutters or shovels and deposited at the sides of the trench in a clean and regular manner as the machine is moved along. By this means the walls of the ditch will be maintained substantially vertical and of the full depth desired to insure a proper channel or bed for the desired drainage purposes.

These and other features of my invention are more fully described hereinafter, reference being had to the accompanying drawings, in which:

Figure 1, is a plan view of a ditching machine embodying my invention.

Fig. 2, is a side elevation of the same in the position of cutting.

Fig. 3, is a cross sectional view on the line III—III, Fig. 1; such view being on a slightly larger scale.

Figs. 4 and 5, are side elevations similar to Fig. 2, but showing the rear shovel or plow in different planes whereby the final depth of the ditch may be varied, and Figs. 6 and 7, are views of a modified detail within the scope of my invention.

The front plow or cutter 1 of my improved digging or ditching machine is mounted upon skids or planks 2, which may be of any desired length, usually about twenty-two feet, and these skids or planks are spaced apart the width of the ditch to be cut—approximately ten to twelve inches. Mounted on the inner sides of these planks near the forward ends of the same and in advance of the plow 1, are depending cutter blades 3, which blades should be sharp enough to cut through the roots of sedge grass and other root obstructions in the marsh or other ground through which the trench or ditch is being cut, and at the rear of said blades 3, the plow 1 is provided with side plates having sharpened edges 4, and a pointed cutting blade 5, which latter makes a substantially horizontal cut beneath that portion or section of earth to be removed that is being cut at the sides by the blades 3.

The rear face 6 of the plow 1 is upwardly inclined and curved as indicated by the dotted line $x$, so that the spoil is carried up over the same until it strikes a curved wall 7 of a substantially horizontal passageway 8, being overturned by said inclined and curved side wall 7, which is set relatively diagonally with respect to the machine so that this layer of removed material may be discharged in a continuous longitudinal section at the side of the ditch. The plow 1 is in substantially fixed position; being held by suitable frames or side plates 9, which may be connected to or continuous with the side plates having the sharpened edges 4, and in the present instance this plow has been set in position to make a ditch cut about fifteen inches in depth.

Such a ditch may be deepened to any desired extent, up to approximately thirty-one inches, by the use of a second plow 10 disposed below and to the rear of the first plow 1, and adjustable for depth of cut with reference to said first plow; being connected therewith by link-members 11, pivotally attached to the respective structures at 12 and 13; the latter connection being in the form of a cross-bar underlying the plow 10. The members 11 not only form a flexible connection between the two plows but are also provided with forward cutting edges 14 so as to cut the soil at the sides of the ditch or trench in line with the upper cuts made by the side blades 3 and cutting edges 4.

The plow 10 is pivotally connected to a cross-bar mounted on the skids or planks 2ª disposed at the rear of the skids 2, and these rear skids or planks are adjustably and detachably connected with the skids or planks 2 supporting the front plow, by means of the links of chains 16. In the present instance, these chains are carried by or attached to suitable eye members 17 mounted at the front of the skids or planks 2ª, while the skids or planks 2 carry a connecting bar 18 having upturned ends 19 to which any one of the links of each chain may be connected; said bar being supported by a bracket 20 carried by the skids or planks 2 at their ends, and said bar having a handle 21 whereby it may be operated; such handle being held to one of the skids or planks 2 when the ends 19 are in the vertical position and engaged by the chain links by means of a latch 22.

The structure as shown in Figs. 1 and 2, is provided with the shortest connection possible, with the connecting means employed, between the sets of skids; such arrangement throwing the plow 10 to the lowermost point for the deepest cut. When it is desired to lessen the depth of the cut effected by the plow 10, the distance between the sets of skids is lengthened as indicated in Figs. 4 and 5, where, as in Fig. 4, the third links of the chains are in engagement with the upturned ends 19 of the cross-bar 18, while in Fig. 5, the fifth links of the chains are in engagement with said cross-bar. By employing this connection and by reason of the flexibly connected members 11 between two plows, the position of said plow 10 will naturally be raised with reference to the plow 1, and will automatically assume the different planes shown in the drawings. By employing members 11, of different length, differences in the depth of cut made by said plow 10 can also be effected. The front ends of the skids 2ª are connected together by a cross-piece 25, which is preferably arched for the passage of spoil along the surface of the plow 10.

The forward end of the plow 10 may be provided with a cutting edge 26, which may be notched or serrated, if desired. The plow 10 is provided with hooks 27 for engagement with the cross-bar 13, and to hold it in position I may employ a rope, cord or chain 28, which is attached to the cross-piece 13 and passes over a hook 29 carried by the under side of the plow 10 and which may be readily turned to release the same when it is desired to detach the parts. The plow 10 can then be unshipped, and the members 11, which may have their ends connected by a cross bar, drag along the bottom of the ditch or trench cut by said plow 1.

The spoil from the lower and second cut passes rearwardly along the upwardly inclined face of the second plow 10 to a substantially horizontally-surfaced deflector 30, and is diverted by the curved side wall 31 of the same and delivered on the surface of the ground adjacent the side of the ditch, opposite the side receiving the spoil from the upper and first cut made by the plow 1.

The knives or blades 3 which are designed to cut through the sedge grass and roots of the same at the surface occasionally strike tough roots of coarse grass, weeds and other obstructions difficult and in some instances impossible to cut and which would clog the machine if provision was not made to remove the same. To avoid such clogging, the blades 3 are discontinued at the rear as indicated at 35, at an angle substantially parallel with the face of the angular sharpened edges 4 of the side plates 9 of the plow 1; hence any material that cannot be cut by the blades 3 will be held down thereby until they can pass over the same, and by the forward movement of the plow such roots and other obstructions will be engaged by the plow 1 and travel up the edges 4 of the side plates of the plow and emerge at the top of the skids or planks through openings 36 formed in the latter; such openings being preferably protected by metal lining plates 37. These roots and other obstructions will be raised alongside and with the upper cut of spoil removed by the forward plow, and they may be raked aside by attendants.

In lieu of using chains 16 and the cross bar 18 with its upturned ends 19 to which the chains are attached for providing an adjustable connection between the front and rear skids, I may provide an adjustable connection such as shown in Figs. 6 and 7, in which cross-bars 38 are provided at the meeting ends of the sets of skids, 2 and 2ª; the latter being provided with sleeves 39 through which said bars 38 pass. In this arrangement, the skids are connected together by the side plates 40, secured to the bars 38 by nuts 41, which bars are provided with a plurality of holes 42 so that the distance between the ends of the skids may be changed at will to regulate the depth of cut made by the rear plow 10. The connection is made relatively loose so that the rear skids may properly follow the front skids and operatively carry the rear plow 10 to make the deeper cut at the depth desired.

The skids 2 are preferably held in the separated position by cross-pieces one of which is in the form of a bracket 20, while another, at the front of the skids, is indicated at 45. The rear skids are connected at the front ends by the cross piece 25, while their rear ends are connected by the cross-bars 46 upon which the earth deflector 30 is mounted.

In use, the machine is set in the ground by making a cavity in line with the desired direction of the ditch, sufficient to receive the plows of the machine, and a suitable pulling machine for the ditching structure may be set a suitable distance away, say five hundred feet. Such pulling machine should be equipped with a winding drum and cable, and the ditching machine is provided with a shackle 47 for connection with the cable of a pulling machine; such shackle being carried by the cross-piece 45 at the forward end of the skids or planks 2 carrying the forward plow. Conditions may make it desirable to change the connection for this shackle with the cross-piece 45, and for this purpose said cross-piece may have a number of apertures 48 for the reception of a bolt 49 connecting said shackle to the cross-piece.

As this application possesses matter in common with an application filed by me April 26, 1916, Serial No. 93,729, it is to be treated as a continuation of said prior application as far as the common subject-matter is concerned.

I claim:

1. In a ditch or trench cutter, the combination of a frame including longitudinally spaced beams adapted to slide on the surface of the ground, a plow or cutter carried by and depending below said beams, independent cutting blades mounted in advance of said plow, cutting plates at the sides of the plow, and a delivery chute leading rearwardly and upwardly from the plow; said beams being recessed on the inside adjacent the rear of the cutting blades for the passage of uncut root members carried up at the sides of the plow.

2. The combination, in a ditch or trench digger, of a pair of spaced beams or skids adapted to slide along the surface of the ground, a plow disposed between said skids and depending below the same, a chute having a curved upper portion for delivering spoil alongside the skids; said chute being continuous with said plow, a second set of skids flexibly connected to the first set, a second plow disposed at the rear of and partially underlying the first plow, and independent cutter blades in advance of the first plow.

3. The combination, in a ditch or trench digger, of a pair of spaced beams or skids adapted to slide along the surface of the ground, a plow disposed between said skids and depending below the same, a chute having a curved upper portion for delivering spoil alongside the skids; said chute being continuous with said plow, a second set of skids flexibly connected to the first set, a second plow pivotally connected to said second set of skids and disposed at the rear of and partially underlying the first plow, independent cutter blades in advance of the first plow, and means connecting the plows and serving to regulate the depth of cut of the second plow.

4. The combination, in a ditch or trench digger, of a pair of spaced beams or skids adapted to slide along the surface of the ground, a plow disposed between said skids and depending below the same, an upwardly extending chute in line with the plow for delivering spoil alongside the skids, a second set of skids adjustably and flexibly connected to the first set, a second plow carried by said second set of skids, independent cutter blades in advance of the first plow, and cutting links connecting the plows.

5. The combination, in a ditch or trench digger, of a pair of spaced beams or skids adapted to slide along the surface of the ground, a plow disposed between said skids and depending below the same in relatively fixed position, an upwardly extending chute in line with the plow for delivering spoil alongside the skids, a second set of skids at the rear of the first set, sets of chain links connecting said skids whereby the space between the adjoining ends of the same may be adjusted, a second plow carried by said second set of skids and automatically adjustable with respect to the first plow whereby its depth of cut is regulated upon adjusting the space between the respective sets of skids, independent cutter blades in advance of the first plow, and links with cutting edges connecting the plows and disposed in advance of the second plow.

6. The combination, in a ditch or trench cutter, of a plurality of sets of skids adapted to travel on the surface of the ground, plows carried by each of said skids, cutting means in advance of each plow, chutes substantially continuous with said plows for delivering the spoil to opposite sides of the skids, the forward pair of skids being recessed adjacent the forward plow whereby uncut portions of roots may be released without jamming said plow, and means for detachably connecting the pairs of skids together.

7. The combination, in a ditch or trench cutter, of a plurality of sets of skids adapted to travel on the surface of the ground, plows carried by each of said skids, cutting means in advance of each plow; the cutting means in advance of the forward plow being independent thereof, chutes substantially continuous with said plows for delivering the spoil to opposite sides of the skids, and flexible means detachably connecting together the pairs of skids; the cutting means in advance of the rear plow being pivotally connected to both plows and serving with the flexible means detachably connecting the pairs of skids together to adjust the rear plow for different depths of cut.

8. The combination, in a ditch or trench cutter, of a plurality of sets of skids adapted to travel on the surface of the ground, plows carried by each of said skids, cutting blades in advance of the first plow, chutes substantially continuous with said plows for delivering the spoil to opposite sides of the skids, means detachably connecting the pairs of skids together, and links pivotally connecting the second plow and the first plow and serving with the flexible means detachably connecting the pairs of skids together to adjust the second plow for different depths of cut.

9. The combination, in a ditch or trench cutter, of a plurality of sets of skids adapted to travel on the surface of the ground, plows carried by each of said skids, independent cutting blades in advance of the first plow, chutes substantially continuous with said plows for delivering the spoil to opposite sides of the skids, adjustable means detachably connecting the pairs of skids together, and links pivotally connecting the second plow and the first plow and serving with the flexible means detachably connecting the pairs of skids together to adjust the rear plow for different depths of cut; said links having forwardly disposed cutting edges.

10. In a ditch or trench cutter, the combination of a frame including longitudinally spaced beams or skids, a plow depending below said beams, cutting blades mounted adjacent said plow and spaced from the same, and a delivery chute leading rearwardly and upwardly from the plow; said skids being recessed on the inside adjacent the rear of the cutting blades for the passage of uncut root members carried up at the sides of the plow.

11. In a ditch or trench cutter, the combination of a frame including longitudinally spaced beams or skids, a plow depending below said beams, cutting blades mounted in advance of said plow, cutting blades at the side of the plow and spaced rearwardly from the cutting blades in advance of the plow, a delivery chute leading upwardly and rearwardly from the plow; said skids being recessed on the inside adjacent the cutting blades of the plow for the passage of uncut root members carried up along the edges of the side blades of the plow.

12. The combination, in a ditch or trench digger, of a pair of spaced beams or skids adapted to slide along the ground, a plow disposed between said skids and depending below the same, a chute having a curved upper portion for delivering spoil alongside the skids continuous with said plow, a second set of skids hingedly connected to the first set, a second plow disposed at the rear of and partially underlying the first plow, and cutter blades carried by the skids and mounted in advance of the first plow.

13. The combination, in a ditch or trench digger, of a pair of spaced beams or skids adapted to slide along the ground, a plow disposed between said skids and depending below the same, an upwardly extending chute in line with the plow for delivering spoil alongside the skids, a second set of skids hingedly connected to the first set, a second plow carried by said second set of skids, cutter blades carried by the skids and mounted in advance of the first plow, and cutting links connecting the plows.

14. The combination, in a ditch or trench cutter, of a plurality of sets of skids disposed in line with each other and adapted to travel on the ground, a pivotal connection between said sets of skids, a plow carried by each set of said skids, cutting means in advance of each plow, and chutes carried between the skids and substantially continuous with said plows for delivering the spoil over the skids and to opposite sides of the same.

15. The combination, in a ditch or trench cutter, of a plurality of sets of skids adapted to travel on the ground, plows carried by each of said sets of skids, cutting means in advance of each plow, chutes substantially continuous with said plows for delivering the spoil over the skids and to opposite sides of the same, the forward pair of skids being recessed on the inside adjacent the forward plow whereby uncut portions of roots carried up by the edges of the plow may be released without jamming said plow, and means for detachably connecting the pairs of skids together.

16. The combination, in a ditch or trench cutter, of a plurality of sets of skids adapted to travel on the ground, plows carried by each of said sets of skids, cutting blades in advance of the first plow, chutes substantially continuous with said plows for delivering the spoil over the skids and to opposite sides of the same the forward pair of skids being recessed on the inside adjacent the forward plow whereby uncut portions of roots carried up along the edges of the side blades of the plow may be released without jamming the plow, means detachably connecting the sets of skids together, and links having forwardly disposed cutting edges connecting the first plow with the second plow.

17. In a ditch or trench cutter, the combination of a suitable frame including a pair of longitudinal skids spaced apart, a plow carried by said skids and depending below the same, a delivery chute leading upwardly continuous with said plow, a second pair of skids hingedly and detachably connected with the forward set, and a second plow pivotally hung from said skids and from the first plow.

18. In a ditch or trench cutter, the combination of a pair of longitudinal skids spaced apart, a plow depending from said skids, a delivery chute for taking care of the spoil lifted by said plow, a second plow, connections for said second plow comprising links whereby it is pivotally attached to the first plow, said links having sharpened edges, and a chute for the delivery of spoil from said second plow and continuous therewith.

19. In a ditch or trench cutter, the combination of a suitable frame including a pair of longitudinal skids spaced apart, a plow carried by said skids and depending below the same, a delivery chute leading upwardly continuous with said plow, a second pair of skids hingedly and detachably connected with the forward set, a second plow pivotally hung from said skids and from the first plow, and means for detachably connecting said second plow to the first plow.

HAROLD I. EATON.

Copies of this patent may be obtained for five cents each, by addressing the "Commissioner of Patents, Washington, D. C."